(12) United States Patent
Johnson et al.

(10) Patent No.: US 9,494,276 B2
(45) Date of Patent: Nov. 15, 2016

(54) REMOVABLE TRIPOD FOOT WITH SECUREMENT

(75) Inventors: Joseph M. Johnson, San Luis Obispo, CA (US); Matthew Burk, San Luis Obispo, CA (US)

(73) Assignee: Really Right Stuff, LLC, San Luis Obispo, CA (US)

( * ) Notice: Subject to any disclaimer, the term of this patent is extended or adjusted under 35 U.S.C. 154(b) by 0 days.

(21) Appl. No.: 13/366,080

(22) Filed: Feb. 3, 2012

(65) Prior Publication Data
US 2012/0298829 A1 Nov. 29, 2012

Related U.S. Application Data

(60) Provisional application No. 61/489,179, filed on May 23, 2011.

(51) Int. Cl.
*A47B 91/00* (2006.01)
*F16M 11/36* (2006.01)
*F16B 7/18* (2006.01)

(52) U.S. Cl.
CPC ............... *F16M 11/36* (2013.01); *F16B 7/182* (2013.01)

(58) Field of Classification Search
CPC .................. A45F 3/44; E04H 12/2223; E04H 12/2215; F16M 11/32; F16M 11/36; A47B 91/00; A47B 13/021; A47B 91/024

USPC ............ 248/545, 688, 530, 156, 159, 163.1, 248/188, 188.8, 188.9; 108/156
See application file for complete search history.

(56) References Cited

U.S. PATENT DOCUMENTS

| | | | | |
|---|---|---|---|---|
| 2,654,620 A | * | 10/1953 | Tinnerman | 138/89 |
| 2,868,602 A | * | 1/1959 | Drezner | 403/298 |
| 4,079,908 A | * | 3/1978 | Davis | 248/156 |
| 5,046,693 A | * | 9/1991 | Browne | 248/159 |
| 6,629,506 B2 | * | 10/2003 | Park | 108/156 |
| 6,669,153 B1 | * | 12/2003 | Allan | 248/188.9 |
| 6,908,067 B2 | * | 6/2005 | Clasen | 248/533 |
| 7,264,210 B2 | * | 9/2007 | Yu | 248/156 |
| 7,520,485 B1 | * | 4/2009 | Giannetto | 248/530 |
| 8,398,037 B2 | * | 3/2013 | Johnson et al. | 248/163.2 |
| 2002/0109053 A1 | * | 8/2002 | Lemieux et al. | 248/187.1 |
| 2004/0227040 A1 | * | 11/2004 | Crain | 248/188.8 |
| 2005/0161560 A1 | * | 7/2005 | Kjellman | 248/163.1 |
| 2008/0251663 A1 | * | 10/2008 | Tracy et al. | 248/188.8 |
| 2009/0278020 A1 | * | 11/2009 | Marcil | 248/545 |
| 2010/0005701 A1 | * | 1/2010 | Santiago et al. | 43/21.2 |

* cited by examiner

*Primary Examiner* — Bradley Duckworth
(74) *Attorney, Agent, or Firm* — Chernoff Vilhauer McClung & Stenzel, LLP

(57) ABSTRACT

Installation of a removable tripod foot is facilitated by a cross-axis aperture in the foot and loosening of the threaded connection of the foot and the tripod's leg is resisted by a resilient element engaging interfacing surfaces of the foot and the leg.

14 Claims, 4 Drawing Sheets

REMOVABLE TRIPOD FOOT WITH SECUREMENT

CROSS-REFERENCE TO RELATED APPLICATIONS

This application claims the benefit of U.S. Provisional App. No. 61/489,179, filed May 23, 2011.

BACKGROUND OF THE INVENTION

The present invention relates to a removable foot for a tripod and, more particularly, to a mechanism to aid in tightening and to resist loosening of a threaded connection between a foot and a leg of a tripod.

Tripods are used for both still and motion photography to provide stability and prevent unintended movement of the camera. A tripod reduces camera movement to enable the sharpest image and is especially useful when using a telephoto lens or longer exposure time because any camera movement while the shutter is open will blur the image. A tripod also aids in framing an image or in capturing multiple images of the same scene, for example when bracketing an exposure. A tripod enables controlled movement of the camera when panning, facilitating tracking a moving subject with a motion video camera or capturing multiple stills for a panoramic image.

Removable feet can increase the utility of a tripod by enabling use of specialized feet for particular surfaces and conditions. However, removable feet are commonly attached to a tripod's legs by screw threads which can be difficult to tighten and may loosen making the tripod unstable and increasing the likelihood that a foot will be lost. What is desired, therefore, is a removable tripod foot that is easy to install and resists loosening.

DETAILED DESCRIPTION OF PREFERRED EMBODIMENTS

Figure 1:
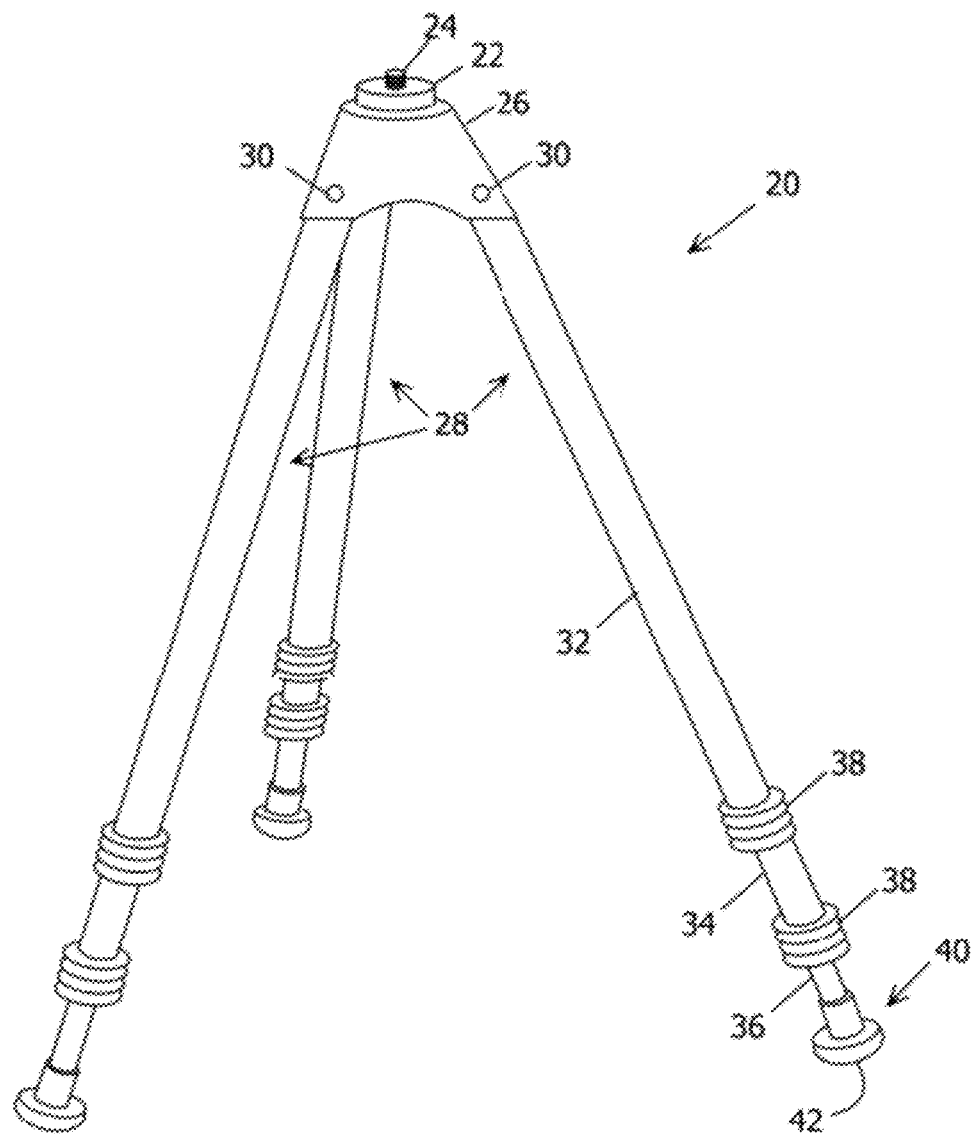
FIG. 1 is perspective view of a tripod.

Referring in detail to the drawings where similar parts are identified by like reference numerals, and, more particularly to FIG. 1, a tripod 20 is useful for both still and motion photography. Typically, a tripod comprises an apex mount 22 including a mechanism, such as a threaded stud 24, for securing a camera or an intermediate interface, such as a ball head or panoramic element, to which a camera can be secured. The apex mount 22 is secured to an apex structure 26 which is also the anchor point for the three legs 28 of the tripod. Each of the legs is typically secured to the apex structure 26 by a pivot joint 30 enabling the legs to be pivoted toward each other for transport and pivoted apart when the tripod is deployed for use. The legs 28 commonly comprise a plurality of leg sections, such as the three leg sections 32, 34, and 36, that telescope together to reduce the length of the collapsed tripod for transport or to enable adjustment of the height of the deployed tripod or compensation for an irregular supporting surface. A locking mechanism 38 which may be actuated by twisting secures the relative positions of the telescoping tube sections. Photographic tripods are preferably light weight and compact to facilitate transportation and the leg sections commonly comprise tubes of light weight materials such as aluminum or carbon fiber.

Figure 2:
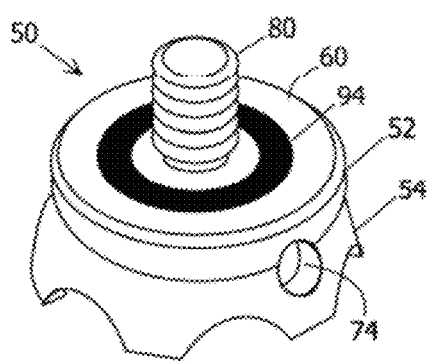
FIG. 2 is a perspective view of a claw-type tripod foot.
Figure 3:
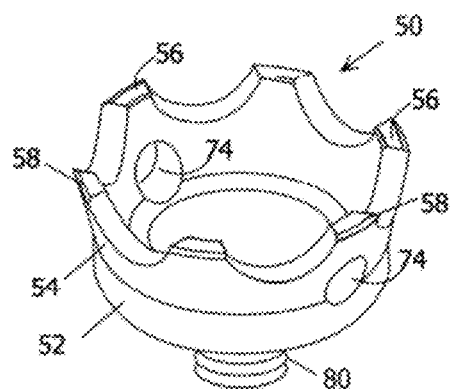
FIG. 3 is a perspective view of the underside to the claw-type foot of FIG. 2.
Figure 4:
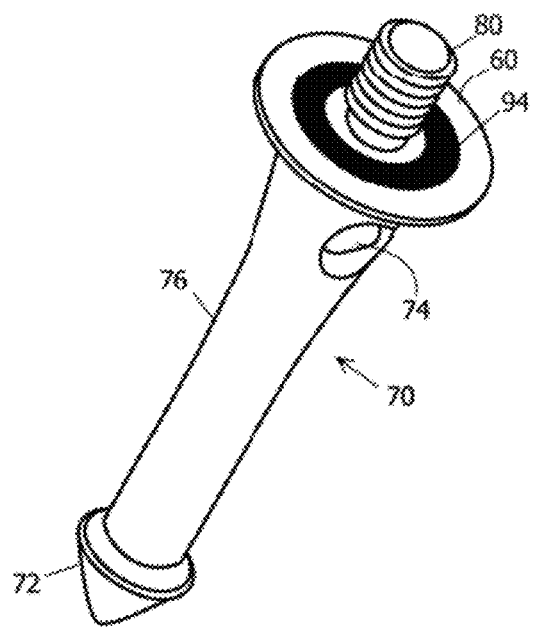
FIG. 4 is a perspective view of a spike tripod foot.

Tripod feet 40 provide the interface between the legs of the tripod and the surface on which the tripod will be supported. The tripod feet commonly have a curved lower surface 42 which is often covered with rubber or plastic to resist sliding on a floor or other supporting surface. While the feet may be permanently affixed to the legs of the tripod, the feet are often removable enabling more specialized feet to be substituted when desired. Referring FIGS. 2 and 3, for example, one type specialized tripod foot is a claw foot 50 having body 52 comprising a crenated wall 54 with a plurality of facets 56 along the lower edge. The sharp edges 58 at the intersections of the facets are intended to bite into a hard, rough surface and secure the tripod even if the surface is wet. Referring to FIG. 4, another type of specialized tripod foot is a spike foot 70. The pointed end portion 72 of the foot's spike-like body 76 is intended to penetrate loose surface material providing additional support on shifting surfaces or in strong winds.

Figure 5:
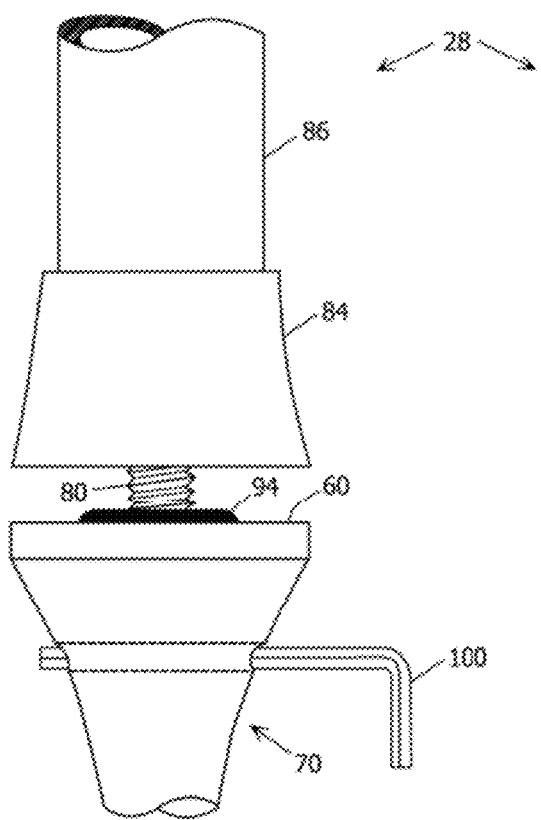
FIG. 5 is an elevation view of a portion of a tripod leg and a removable foot.
Figure 6:
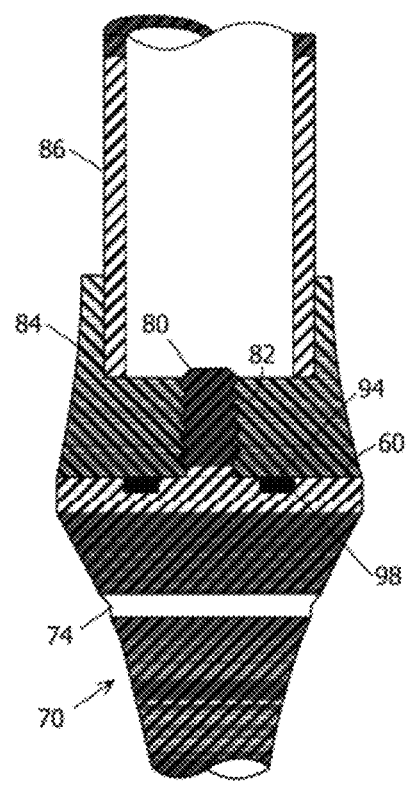
FIG. 6 is a section view of a portion of a tripod leg and a removable foot.
Figure 7:
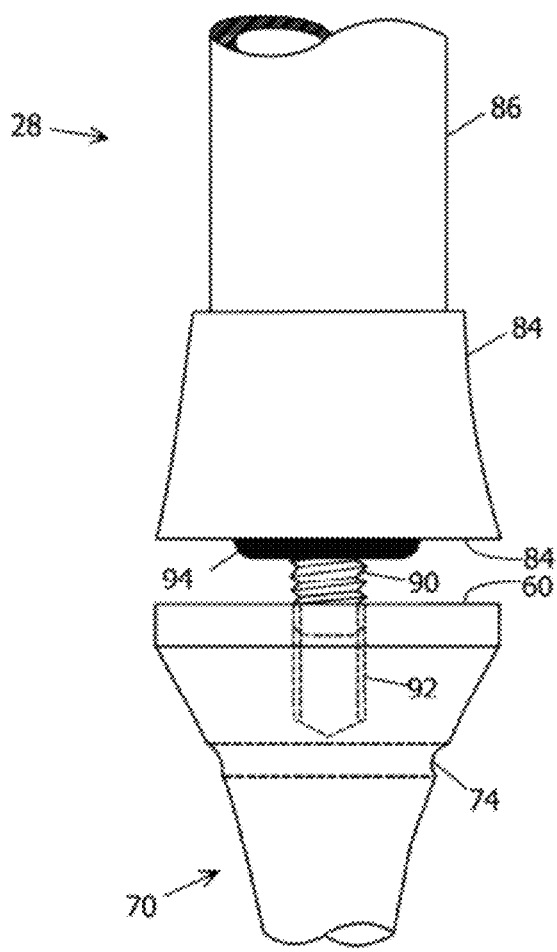
FIG. 7 is an elevation view of a portion of a tripod leg and a removable foot of a second embodiment.

Referring to also FIGS. 5 and 6, replaceable tripod feet are commonly affixed to the leg of the tripod by screwing a threaded stud 80 projecting from the foot into a threaded aperture 82 in a ferrule 84 which is secured to the end of a tubular leg section 86. On the other hand, referring to FIG. 7, the gender of the threads in the ferrule and the foot may be reversed with male threads of a threaded stud 90 projecting from the ferrule to engage female threads in an aperture 92 in the foot. While a threaded connection makes replacement straight forward, it can be difficult to fully tighten the threaded connection. The feet can also loosen as a result of cyclic loads and vibration as the tripod is repeatedly deployed or moved across a supporting surface; a condition that is exacerbated by the difficulty in tightening the feet. When the threaded feet loosen, the tripod becomes unstable and the feet may eventually become detached from the tripod. To prevent the removable feet from loosening, a liquid thread locker is commonly applied to the threads but this is time consuming and the container may leak damaging other equipment in a camera bag. On the other hand, threaded connections with prevailing torque features increase the torque required to tighten, as well as loosen, the connection making tightening and removal more difficult and the features may wear and become ineffective with repeated use. The applicants concluded that a mechanism that would permit removable tripod feet to be easily tightened but would reliably resist loosening would substantially improve the utility of a tripod.

Figure 8:
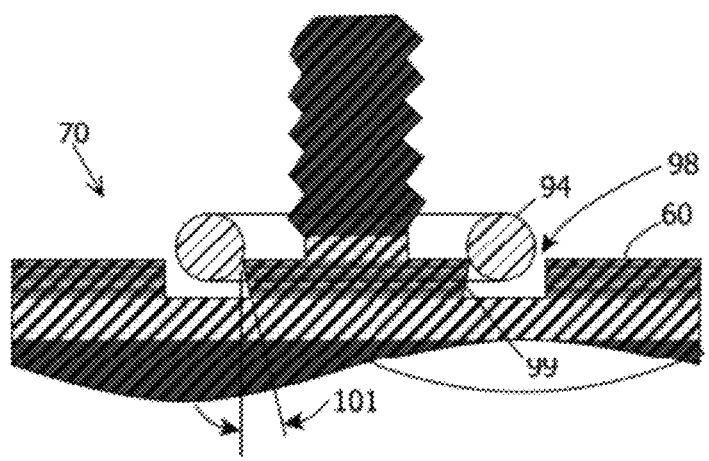
FIG. 8 is an enlarged view of a portion of the section of FIG. 6.

The removable feet 50, 70 for use with the tripod 20 include a resilient element 94 at the interface between the foot and the ferrule 84 secured to the end of the tripod's leg 28. As illustrated in FIG. 5, the resilient element 94 may be supported by the leg engaging surface 60 of the removable foot, but, referring to FIG. 7, the resilient element 94 could be applied to the foot engaging surface 96 of the ferrule 84. The resilient element increases friction between the interfacing surfaces of the foot and the ferrule to resist loosening of the threaded connection. While the elastomeric element could have any shape and could be applied to the respective surface, it is, preferably, a toroidal element, and, more preferably, an elastomeric o-ring installed in a groove 98 in one of the interfacing surfaces 60, 96. Referring also to FIG. 8, the groove 98 has an inner wall 99 which is undercut at an angle 101. The diameter of the groove at the point of intersection of the inner wall with the interfacing surface 60 is slightly greater than the inner diameter of the resilient element 94. When the resilient element is installed in the groove it must be stretched slightly. When the resilient element is released in the groove, it returns to its original size and is trapped in the groove against the sloping inner wall. On the other hand, the resilient element could be retained in the groove by an outer wall that sloped to a diameter, at the interfacing surface, that is slightly smaller than the outer diameter of the resilient element. A portion of the resilient element projects proud of the respective leg engaging surface 60 or foot engaging surface 96 so that the resilient element is compressed when the threaded connection is tightened. While an o-ring is inexpensive, the dimensions and characteristics of o-rings are carefully controlled and the force exerted by the o-ring is predictable enabling the foot to be tightened so that the interfacing surfaces 60 and 96 come in contact. Contact between the rigid leg engaging and foot engaging surfaces enhances the stability of the foot and the tripod and increases friction in the threaded connection which resists loosening. The compressed resilient element exerts a resilient separating force at the interfacing surfaces maintaining friction in the engaged screw threads during vibration and cyclic loading and resisting loosening of the threaded connection. Since the resilient element 94 does not come in contact with both of the interfacing surfaces until the surfaces are proximate each other, the foot screws easily into the ferrule for a major portion of the length of the threaded connection.

To compress the resilient element and bring the leg engaging surface into contact with the foot engaging surface, an aperture(s) 74 which extends substantially normal to the longitudinal axis of the threaded element in the foot is provided in the body of the foot. A tool, such as a rod, an allen wrench 100 or the shank of a screw driver can be inserted into the aperture providing the necessary leverage to fully tighten the threaded connection.

The resilient element at the interfacing surfaces of a removable foot and a tripod leg and a cross-axis aperture facilitates installation of the foot and resists loosening of the threaded connection.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A foot for a tripod comprising:
   (a) a body including an interface surface including a portion arranged to engage a terminal portion of a leg of a tripod and an elongate threaded portion arranged substantially normal to the portion of the interface surface arranged to engage a leg of a tripod;
   (b) a resilient element engaging the interface surface;
   (c) wherein said resilient element includes a portion extending proud of the portion of said interface surface arranged to engage the leg of a tripod;
   (d) wherein said interface includes an outer peripheral edge and said resilient element is sized such that it is completely within said outer peripheral edge of said interface surface;
   (e) wherein said resilient element is resilient and has an outer diameter, and further said body includes a body outer peripheral surface with an outer diameter, where the resilient element outer diameter is smaller than the body outer peripheral surface outer diameter;
   (f) wherein said body includes a crenated wall defining a plurality of facets arranged to engage a surface supporting said tripod, wherein each of said facets has an elongate portion perpendicular to the axis of said elongate threaded portion, wherein a respective arc is defined in said crenated wail extending the entire distance between each of said plurality of facets, where each of said respective arc does not define a discontinuity therein between each of said plurality of facets;
   (g) wherein said body defines a first opening in said body at a location directly above a first said facet at an elevation above the upper portion of each of said arc defined on either side of said first facet;
   (h) wherein said body defines a second opening in said body at a location directly above a second said facet at an elevation above the upper portion of each of said arc defined on either side of said second facet;
   (i) wherein said first opening is aligned with said second opening, said first opening and said second opening are aligned with said elongate threaded portion;
   (j) wherein said body defines an upper exterior surface at an elevation above said upper portion of each of said arc defined on either side of said first facet, and at an elevation above said upper portion of each of said arc defined on either side of said second facet;
   (k) wherein said body defines a lower exterior surface at an elevation below said upper exterior surface and adjacent thereto;
   (i) wherein said first opening is defined in a part of said upper exterior surface and in a part of said lower exterior surface, said second opening is defined in part of said upper exterior surface and in part of said lower exterior surface, and wherein said upper exterior surface and said lower exterior surface define a discontinuity therein around said body.

2. The foot of claim 1 further comprising an aperture defined by said first opening and said second opening and extending substantially normal to a longitudinal axis of said threaded portion.

3. The foot of claim 1 wherein the interface surface includes a portion defining a circular groove and the resilient element comprises an elastomeric toroid retained in the groove with a portion of a surface of the resilient element projecting proud of the portion of the interface surface arranged to engage the leg of a tripod.

4. The foot of claim 3 wherein the portion of the interface surface defining the circular groove defines a circular inner wall having a first diameter greater than an inner diameter of the toroidal resilient element at the inner wall's intersection with the portion of the interface surface arranged to engage the leg of a tripod and a second diameter, smaller than said first diameter, at a point distal of the inner wall's intersection with the portion of the interface surface arranged to engage the leg of a tripod.

5. The foot of claim 3 wherein said resilient element comprises an o-ring.

6. The foot of claim 1 wherein said elongate threaded portion of said body comprises a stud projecting from said surface.

7. The foot of claim 1 wherein said elongate threaded portion of said body comprises a portion defining a threaded aperture.

8. A tripod comprising:
(a) a leg having an end portion including a foot engaging terminal surface and defining a threaded leg portion including a surface defining a first gender thread;
(b) a removable foot comprising a leg engaging surface and defining a threaded foot portion including a surface defining a second gender thread, said threaded foot portion arranged for threaded engagement with said threaded leg portion;
(c) a resilient element arranged to engage said foot engaging surface and said leg engaging surface when said threaded foot portion is engaged with said threaded leg portion;
(d) wherein said resilient element includes a portion extending proud of the portion of said foot engaging surface;
(e) wherein said foot engaging surface includes an outer peripheral edge and said resilient element is sized such that it is completely within said outer peripheral edge of said foot engaging surface;
(f) wherein said resilient element is resilient such that when said removable foot with said resilient element engaged with said terminal surface of said leg of said tripod that said resilient element is not visible from the periphery of said removable foot and said leg of said tripod and further said leg includes a leg outer peripheral surface and said foot includes a foot outer peripheral surface that when fully engaged with one another come into pressing engagement with one another in a manner such that said resilient element is not visible from the periphery of said leg and said foot;
(g) wherein said foot includes a crenated wall defining a plurality of facets arranged to engage a surface supporting said tripod, wherein each of said facets has an elongate portion perpendicular to the axis of said elongate threaded portion, wherein a respective arc is defined in said crenated wail extending the entire distance between each of said plurality of facets, where each of said respective arc does not define a discontinuity therein between each of said plurality of facets;
(h) wherein said foot defines a first opening in said foot at a location directly above a first said facet at an elevation above the upper portion of each of said arc defined on either side of said first facet;
(i) wherein said foot defines a second opening in said foot at a location directly above a second said facet at an elevation above the upper portion of each of said arc defined on either side of said second facet;
(j) wherein said first opening is aligned with said second opening, said first opening and said second opening are aligned with said elongate threaded portion;
(k) wherein said foot defines an upper exterior surface at an elevation above said upper portion of each of said arc defined on either side of said first facet, and at an elevation above said upper portion of each of said arc defined on either side of said second facet;
(l) wherein said foot defines a lower exterior surface at an elevation below said upper exterior surface and adjacent thereto;
(m) wherein said first opening is defined in a part of said upper exterior surface and in a part of said lower exterior surface, said second opening is defined in part of said upper exterior surface and in part of said lower exterior surface, and wherein said upper exterior surface and said lower exterior surface define a discontinuity therein around said foot.

9. The tripod of claim 8 wherein said resilient element is compressed when said foot engaging surface and said leg engaging surface are proximate.

10. The tripod of claim 8 wherein said resilient element comprises an elastomeric toroid arranged in a portion of one of said foot engaging surface and said leg engaging surface defining a groove and including a portion extending proud of said one of said foot engaging surface and said leg engaging surface.

11. The tripod of claim 10 wherein said elastomeric toroid comprises an o-ring.

12. The tripod of claim 8 wherein said removable foot further a body defining an aperture defined by said first opening and said second opening and extending substantially normal to a longitudinal axis of said threaded foot portion.

13. The tripod of claim 8 wherein said threaded foot portion comprises a stud projecting from said leg engaging surface and said surface of said threaded foot portion defines a male thread.

14. The tripod of claim 8 wherein said threaded foot portion comprises a portion of said removable foot defining an aperture and said surface of said threaded foot portion defines a female thread.

* * * * *

UNITED STATES PATENT AND TRADEMARK OFFICE
CERTIFICATE OF CORRECTION

| | | |
|---|---|---|
| PATENT NO. | : 9,494,276 B2 | Page 1 of 1 |
| APPLICATION NO. | : 13/366080 | |
| DATED | : November 15, 2016 | |
| INVENTOR(S) | : Joseph M. Johnson and Matthew Burk | |

It is certified that error appears in the above-identified patent and that said Letters Patent is hereby corrected as shown below:

In the Claims

Column 4, Line 26:
Change "wail" to read --wall--.

Column 5, Line 52:
Change "wail" to read --wall--.

Signed and Sealed this
Third Day of October, 2017

Joseph Matal
*Performing the Functions and Duties of the
Under Secretary of Commerce for Intellectual Property and
Director of the United States Patent and Trademark Office*